United States Patent
Tsirkin (10) Patent No.: US 12,443,429 B2
(45) Date of Patent: Oct. 14, 2025

(54) MEMORY DEDUPLICATION FOR ENCRYPTED VIRTUAL MACHINES

(71) Applicant: Red Hat, Inc., Raleigh, NC (US)

(72) Inventor: Michael Tsirkin, Yokneam Illit (IL)

(73) Assignee: Red Hat, Inc., Raleigh, NC (US)

( * ) Notice: Subject to any disclaimer, the term of this patent is extended or adjusted under 35 U.S.C. 154(b) by 650 days.

(21) Appl. No.: 17/898,707

(22) Filed: Aug. 30, 2022

(65) Prior Publication Data

US 2024/0069950 A1    Feb. 29, 2024

(51) Int. Cl.
G06F 9/455    (2018.01)
G06F 12/14    (2006.01)
G06F 21/64    (2013.01)

(52) U.S. Cl.
CPC ...... G06F 9/45558 (2013.01); G06F 12/1408 (2013.01); G06F 21/64 (2013.01); *G06F 2009/45583* (2013.01)

(58) Field of Classification Search
CPC .. G06F 9/45558; G06F 12/1408; G06F 21/64; G06F 2009/45583
See application file for complete search history.

(56) References Cited

U.S. PATENT DOCUMENTS

| | | | |
|---|---|---|---|
| 9,135,046 B1 * | 9/2015 | Pratt | G06F 21/575 |
| 9,311,250 B2 | 4/2016 | Van De Ven et al. | |
| 9,652,634 B2 | 5/2017 | Wang et al. | |
| 10,102,057 B2 | 10/2018 | Karamanolis et al. | |
| 10,445,188 B2 | 10/2019 | Zamir | |
| 10,635,639 B2 | 4/2020 | Khot et al. | |
| 11,232,030 B2 | 1/2022 | Tsirkin | |
| 11,354,420 B2 | 6/2022 | Van Riel et al. | |
| 2007/0106993 A1 * | 5/2007 | Largman | G06F 9/45541 718/104 |
| 2015/0381589 A1 * | 12/2015 | Tarasuk-Levin | G06F 12/1408 713/193 |
| 2020/0285589 A1 * | 9/2020 | Imbrenda | G06F 12/1408 |
| 2020/0287709 A1 * | 9/2020 | Bradbury | H04L 9/3239 |
| 2021/0103556 A1 | 4/2021 | Nagrale et al. | |

OTHER PUBLICATIONS

Furquan Shaikh, et al., "VMDedup: Memory De-duplication in Hypervisor", 2014 IEEE International Conference on Cloud Engineering, 2014, 6 pages.

* cited by examiner

*Primary Examiner* — Lewis A Bullock, Jr.
*Assistant Examiner* — Kevin X Lu
(74) *Attorney, Agent, or Firm* — Kilpatrick Townsend & Stockton LLP (57) ABSTRACT

Memory deduplication for encrypted virtual machines is provided by identifying a page in a private memory of an encrypted virtual machine to place into a public memory in a virtualization environment; calculating a checksum for the page and storing the checksum in the private memory of the encrypted virtual machine; passing the page to a hypervisor of the virtualization environment to place into the public memory; calling the page via an application running in the encrypted virtual machine; and in response to verifying the page received from the public memory against the checksum stored in the private memory, proceeding with operation of the application using the page.

17 Claims, 5 Drawing Sheets

MEMORY DEDUPLICATION FOR ENCRYPTED VIRTUAL MACHINES

BACKGROUND

Memory deduplication (also referred to as same-page merging, memory merging, and page deduplication) is a feature in virtualization environments that allows a hypervisor to use one set of memory addresses to serve the same data to multiple guests when the multiple guests have placed copies of the same data into a shared memory. The hypervisor identifies pages (or other divisions) in memory that have identical content, and remaps virtual pages used by the guests to point to one physical page in memory, and releases the other pages for reuse, thereby conserving computing resources in the virtualization environment.

SUMMARY

The present disclosure provides new and innovative techniques for memory deduplication in virtualization environments hosting virtual machines that result in improvements to the operational efficiency and number of guests that can be provided by a set of physical hardware on which the virtualization environment is provided, among other benefits. In one example, a method is provided that comprises identifying a page in a private memory of an encrypted virtual machine to place into a public memory in a virtualization environment; calculating a checksum for the page and storing the checksum in the private memory of the encrypted virtual machine; passing the page to a hypervisor of the virtualization environment to place into the public memory; calling the page via an application running in the encrypted virtual machine; and in response to verifying the page received from the public memory against the checksum stored in the private memory, proceeding with operation of the application using the page.

In one example, a system is provided that comprises a processor; and a memory, including instructions that when executed by the processor perform operations including: identifying a page in a private memory of an encrypted virtual machine to place into a public memory in a virtualization environment; calculating a checksum for the page and storing the checksum in the private memory of the encrypted virtual machine; passing the page to a hypervisor of the virtualization environment to place into the public memory; calling the page via an application running in the encrypted virtual machine; and in response to verifying the page received from the public memory against the checksum stored in the private memory, proceeding with operation of the application using the page.

In one example, a memory device is provided that includes instructions that when executed by a processor perform operations including, comprising: identifying a page in a private memory of an encrypted virtual machine to place into a public memory in a virtualization environment; calculating a checksum for the page and storing the checksum in the private memory of the encrypted virtual machine; passing the page to a hypervisor of the virtualization environment to place into the public memory; calling the page via an application running in the encrypted virtual machine; and in response to verifying the page received from the public memory against the checksum stored in the private memory, proceeding with operation of the application using the page.

Additional features and advantages of the disclosed methods, devices, and/or systems are described in, and will be apparent from, the following Detailed Description and the Figures.

DETAILED DESCRIPTION

Virtualization environments provide for physical computer systems to act as hosts to multiple guests, which are virtualized computer systems than run on a shared set of hardware (e.g., a given physical computer system). When multiple guests store the same data to memory, the host may identify these sets of data as being shared among the multiple guests, and to conserve computing resources in the virtualization environment, the host can remove excess copies of the data from memory, and point each of the guests to the same address in the shared memory to share the otherwise identical sets of data. The process of identifying, removing, and readdressing the duplicated sets of data from several guests can be referred to as deduplication or merging.

Memory deduplication is advantageous to the virtualization environment as more guests can be run on the same host hardware when resources are conserved, but various guests may keep various data private, thereby preventing the host from identifying data that can be deduplicated to converse computing resources. For example, guests that are encrypted may store data in private memory that is encrypted or otherwise inaccessible to the host so that the host cannot identify data that are potentially duplicated by the guest compared to data in the public memory or in the private memory of other encrypted guests. The present disclosure therefore provides a framework for the guests and hosts to perform that allows the guests to shift data from the private memory to the public memory, where the host may deduplicate the data, in a manner that allows the guest to retain control and trust over the data (e.g., guarding against untrusted hosts or malicious guests sharing the virtualization environment) and for the host to conserve computing resources when identifying data to deduplicate. The guests, before transferring the data from private to public memory, calculate a checksum to verify the authenticity of any data returned from the public memory to match with the transferred data before using the received data. Once the data are transferred to the public memory, the hypervisor may identify duplicated data and retain one copy of the duplicated data, which may be served to several different guests. Additionally, the hypervisor may use a checksum (calculated by the guest or the hypervisor) to quickly compare several data sets as being potential duplicates before initiating a more computationally complex full analysis of the several data sets to confirm whether duplicates exist.

Accordingly, the present disclosure improves the operational efficiency of the host, maintains data security for the guests, and reduces or improves the management of the computing resources in the virtualization environment, among other benefits.

Figure 1:
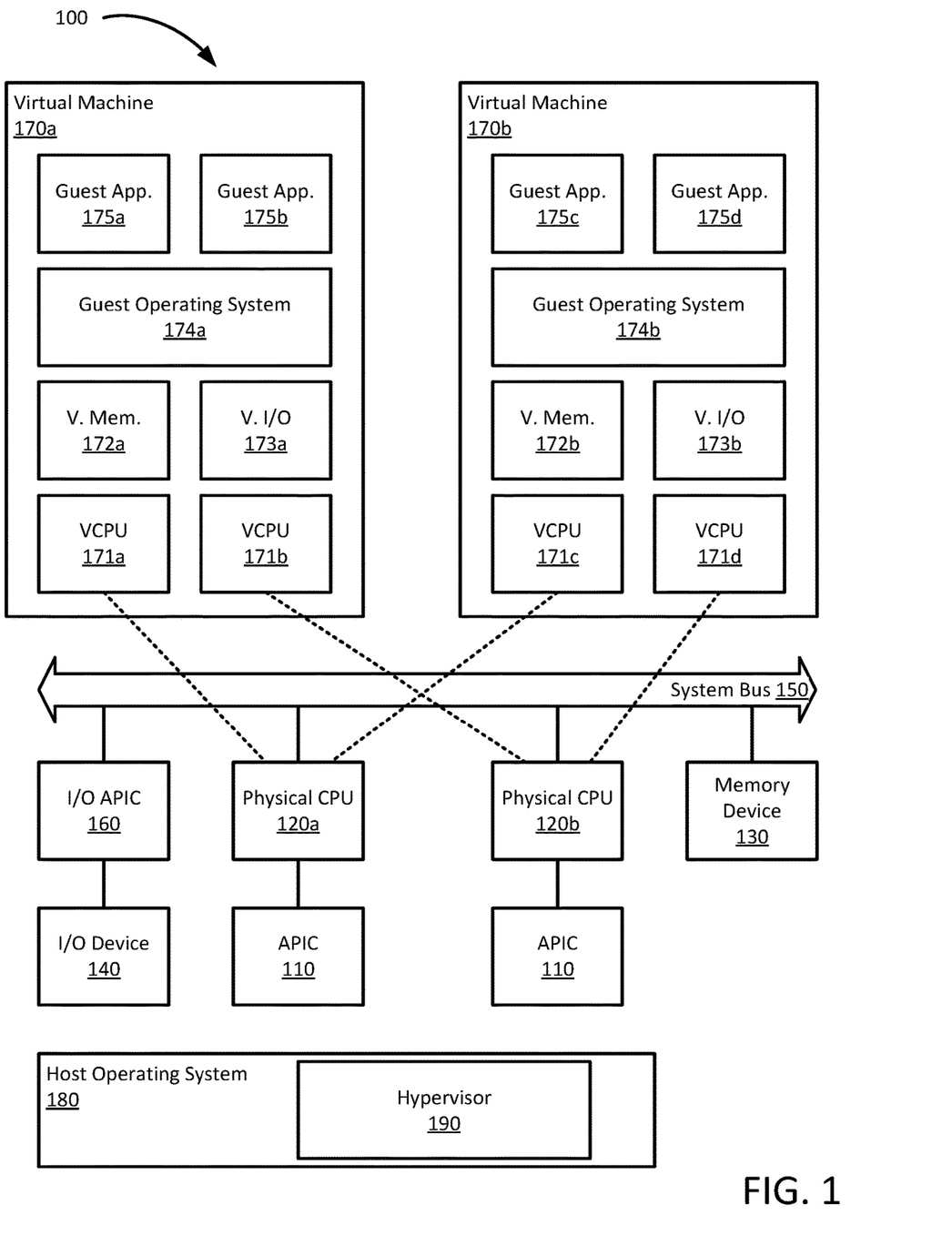
FIG. 1 illustrates a high-level component diagram of a computer system, according to examples of the present disclosure

FIG. 1 illustrates a high-level component diagram of a computer system 100, according to examples of the present disclosure. The computer system 100 may include one or more physical central processing units (PCPUs) 120a-b (generally or collectively, processors or PCPUs 120) communicatively coupled to memory devices 130, and input/output (I/O) devices 140 via a system bus 150.

In various examples, the PCPUs 120 may include various devices that are capable of executing instructions encoding arithmetic, logical, or I/O operations. In an illustrative example, a PCPU 120 may follow Von Neumann architectural model and may include an arithmetic logic unit (ALU), a control unit, and a plurality of registers. In another aspect, a PCPU 120 may be a single core processor which is capable of executing one instruction at a time (or process a single pipeline of instructions), or a multi-core processor which may simultaneously execute multiple instructions. In another aspect, a PCPU 120 may be implemented as a single integrated circuit, two or more integrated circuits, or may be a component of a multi-chip module (e.g., in which individual microprocessor dies are included in a single integrated circuit package and hence share a single socket).

In various examples, the memory devices 130 include volatile or non-volatile memory devices, such as RAM, ROM, EEPROM, or any other devices capable of storing data. In various examples, the memory devices 130 may include on-chip memory for one or more of the PCPUs 120.

In various examples, the I/O devices 140 include devices providing an interface between a PCPU 120 and an external device capable of inputting and/or outputting binary data.

The computer system 100 may further comprise one or more Advanced Programmable Interrupt Controllers (APIC), including one local APIC 110 per PCPU 120 and one or more I/O APICs 160. The local APICs 110 may receive interrupts from local sources (including timer interrupts, internal error interrupts, performance monitoring counter interrupts, thermal sensor interrupts, and I/O devices 140 connected to the local interrupt pins of the PCPU 120 either directly or via an external interrupt controller) and externally connected I/O devices 140 (i.e., I/O devices connected to an I/O APIC 160), as well as inter-processor interrupts (IPIs).

In a virtualization environment, the computer system 100 may be a host system that runs one or more virtual machines (VMs) 170a-b (generally or collectively, VM 170), by executing a hypervisor 190, often referred to as "virtual machine manager," above the hardware and below the VMs 170, as schematically illustrated by FIG. 1. In one illustrative example, the hypervisor 190 may be a component of a host operating system 180 executed by the host computer system 100. Additionally or alternatively, the hypervisor 190 may be provided by an application running under the host operating system 180, or may run directly on the host computer system 100 without an operating system beneath it. The hypervisor 190 may represent the physical layer, including PCPUs 120, memory devices 130, and I/O devices 140, and present this representation to the VMs 170 as virtual devices.

Each VM 170a-b may execute a guest operating system (OS) 174a-b (generally or collectively, guest OS 174) which may use underlying VCPUs 171a-d (generally or collectively, VCPU 171), virtual memory 172a-b (generally or collectively, virtual memory 172), and virtual I/O devices 173a-b (generally or collectively, virtual I/O devices 173). A number of VCPUs 171 from different VMs 170 may be mapped to one PCPU 120 when overcommit is permitted in the virtualization environment. Additionally, each VM 170a-b may run one or more guest applications 175a-d (generally or collectively, guest applications 175) under the associated guest OS 174. The guest operating system 174 and guest applications 175 are collectively referred to herein as "guest software" for the corresponding VM 170.

In certain examples, processor virtualization may be implemented by the hypervisor 190 scheduling time slots on one or more PCPUs 120 for the various VCPUs 171a-d. In an illustrative example, the hypervisor 190 implements the first VCPU 171a as a first processing thread scheduled to run on the first PCPU 120a, and implements the second VCPU 171b as a second processing thread scheduled to run on the first PCPU 120a and the second PCPU 120b.

Device virtualization may be implemented by intercepting virtual machine memory read/write and/or input/output (I/O) operations with respect to certain memory and/or I/O port ranges, and by routing hardware interrupts to a VM 170 associated with the corresponding virtual device. Memory virtualization may be implemented by a paging mechanism allocating the host RAM to virtual machine memory pages and swapping the memory pages to a backing storage when necessary.

Figure 2:
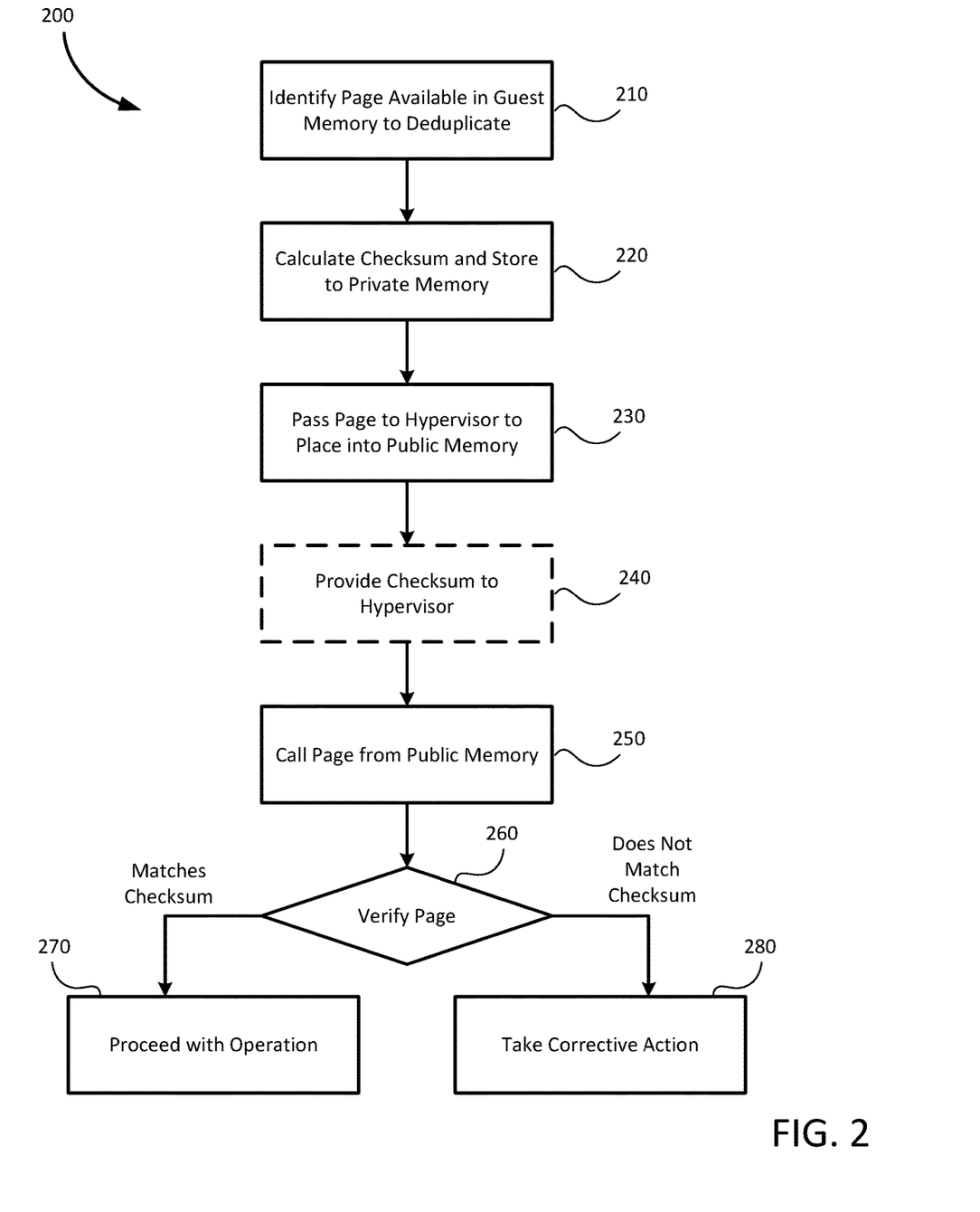
FIG. 2 is a flowchart of a method for deduplicating pages in memory for an encrypted VM in a virtualization environment, according to examples of the present disclosure.

FIG. 2 is a flowchart of a method 200 for deduplicating pages in memory for an encrypted VM in a virtualization environment, according to examples of the present disclosure. Method 200 begins at block 210, where the encrypted VM identifies a page in the private memory of the encrypted VM that is available to be placed into the public memory of the virtualization environment in which the encrypted VM is provided. In various embodiments, the VM identifies pages that, although part of an encrypted virtual system, would not be of concern to the operator if exposed. For example, pages that contain data encoding at least a portion of an open source software component (e.g., a program, module, or library) or openly-known software component (e.g., an office productivity program such as a word processor or spreadsheet program, a web browser, an operating system, a media player) may be identified as available to be placed into public memory. In contrast, the data related to documents or programs marked as proprietary are excluded from being identified as being available (or are identified as being unavailable) for being placed into the public memory. In various embodiments, the encrypted VM may store pages that are available to place into public memory into various ranges of private virtual pages, and a user or administrator for the encrypted VM may identify which data can be placed into these virtual pages and the relative amounts of virtual pages that are available/unavailable for placing into public memory.

The examples given in the present disclosure generally refer to pages of memory, which may refer to different amounts of data according to different processor architectures in the associated physical and virtual systems. Additionally, if the virtualization environment allows for guests to set different pages sizes, the host and/or two or more guests may reference the same data across different numbers or sizes of pages. Accordingly, although the examples given herein refer to memory pages, the described methods may be applied to groups of several pages or divisions of individual pages that accommodate differences between different virtualization environments.

At block 220, the encrypted VM calculates a publication checksum for the page (identified in block 210), and stores the publication checksum in the private memory of the encrypted VM.

At block 230, the encrypted VM passes the page (identified in block 210) to a hypervisor of the virtualization environment to place that page into the public memory. In various embodiments, the hypervisor may reply to the encrypted VM with an address in the public memory where the page is stored or mapped to.

At optional block 240, the encrypted VM optionally provides the publication checksum (calculated in block 220) to the hypervisor with the page passed at block 230, to allow the hypervisor to quickly compare the page with other pages stored in the public memory to identify potentially matching pages already stored to the public memory.

At block 250, after the page identified in block 210 is stored to the public memory (per block 230), the encrypted VM calls for the data stored in the page. In various embodiments, an application running in the encrypted VM attempts to call the page, which results in a fault in the application as the data are no longer located in a page within the encrypted memory. The encrypted VM attempts to resolve the fault by importing the data from the public memory, either using an address supplied by the hypervisor or requesting the hypervisor to identify and return the page previously passed for placement in the public memory.

At block 260, the encrypted VM verifies whether the page received from the public memory (per block 250) that purports to be the page initially passed to public memory (per block 230) contains the same data. The encrypted VM calculates a verification checksum, using the same formula used in block 220, for the purported page, and compares the verification checksum against the publication checksum. When the checksums match, thereby indicating the contents of the purported page received from the public memory are unaltered from those of the page passed to the public memory in block 230, method 200 proceeds to block 270. Otherwise, when the checksums do not match, thereby indicating that the contents of the purported page received from the public memory have been altered from those passed to the public memory (e.g., due to data corruption, malicious alteration, etc.), method 200 proceeds to block 280. Additionally or alternatively, if the hypervisor does not return a page in response to the call in block 250 (e.g., due to timeout, inadvertent or purposeful deletion of the page, etc.), method 200 proceeds to block 280 as no match can be determined.

At block 270, in response to positively verifying the page received from the public memory against the publication checksum stored in the private memory (e.g., that the verification checksum matches the publication checksum), the encrypted VM accepts the page received from the public memory and proceeds with the operation of the application that initially called for the page. In various embodiments, the page is temporarily stored to the private memory for use by the application, and is cleared or deleted from the private memory once the operation completes, a predefined amount of time passes, and may be subsequently called from the public memory if used at a later time (e.g., repeating blocks 250-270).

At block 280, in response to negatively verifying the page received from the public memory against the publication checksum stored in the private memory (e.g., that the verification checksum does not match the publication checksum), the encrypted VM takes various corrective actions to allow the application to continue operating, but does not accept the page from the public memory for use by the application. The corrective action identifies that the purported page received from the public memory does not match the initially publicized page, and that prevent the application from using the page received from the public memory as-received. In various embodiments, the corrective actions may include alerting an operator, initiating a security protocol (e.g., due to a malicious hypervisor or co-guest of the virtualization environment), performing error correction on the page, or retrieving an alternative page (e.g., re-downloading a known-good copy of a software application/library/module/etc.).

Figure 3:
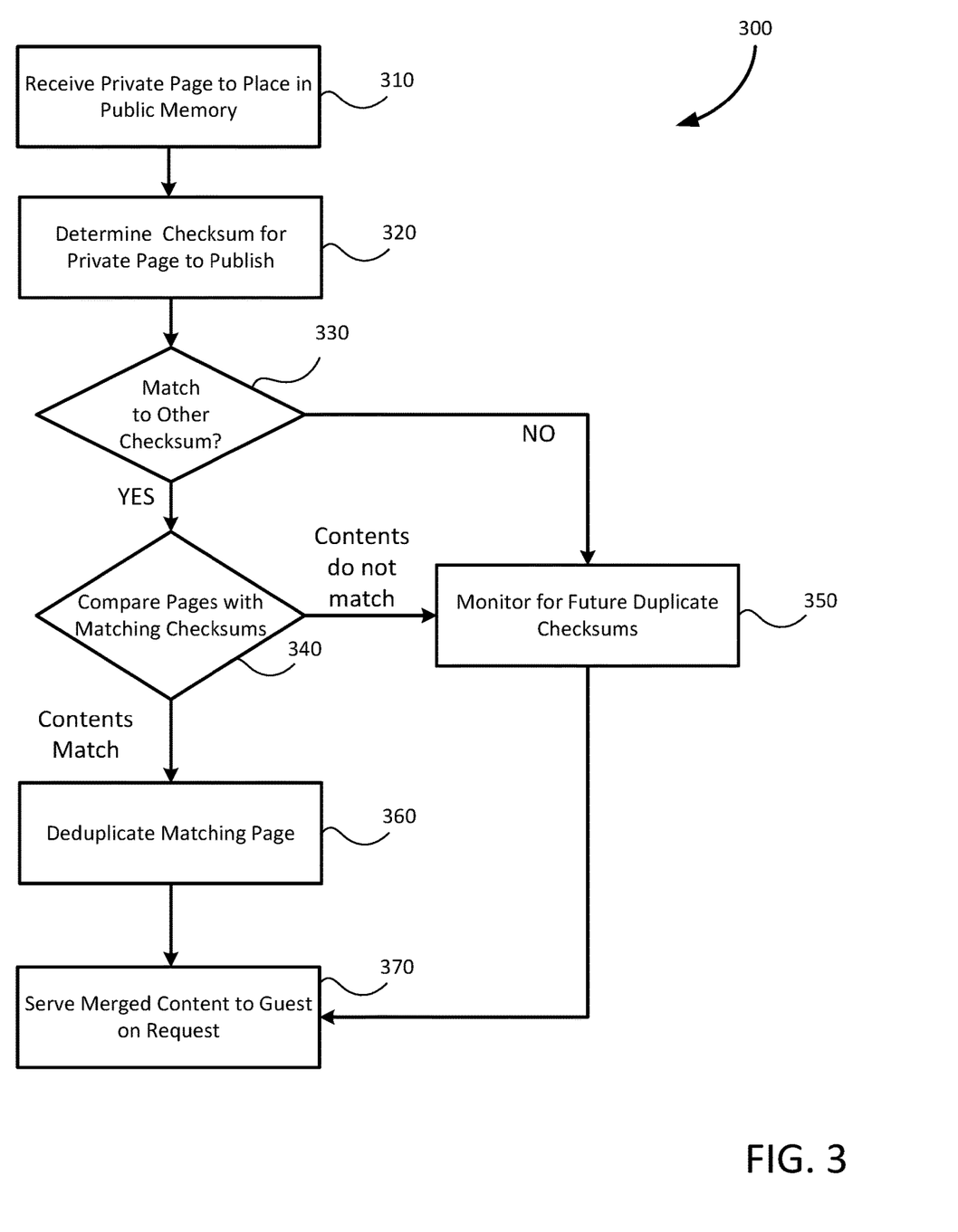
FIG. 3 is a flowchart of a method for deduplicating pages in memory for by a hypervisor in a virtualization environment, according to examples of the present disclosure.

FIG. 3 is a flowchart of a method 300 for deduplicating pages in memory for by a hypervisor in a virtualization environment, according to examples of the present disclosure. Method 300 begins at block 310, where the hypervisor receives a private page from an encrypted VM to place into public memory. In various embodiments, the hypervisor receives a publication checksum for the private page from the encrypted VM.

At block 320, the hypervisor determines a public checksum for the private page (received per block 310) that is to be published in the public memory. In various embodiments, the hypervisor determines to use the publication checksum if one was received in block 310, but additionally or alternatively the hypervisor can also calculate a new public checksum using the contents of the received page. For example, if a page is received without a publication checksum, the hypervisor calculates a new public checksum for that page. In another example, if a page is received with a publication checksum, the hypervisor can determine to use the publication checksum as the public checksum for that page. In another example, if a page is received with a publication checksum, the hypervisor can determine to use the publication checksum as a first public checksum for that page and to calculate a second public checksum to also use for that page (e.g., when the guests and the hypervisor use different algorithms to calculate checksums).

At block 330, the hypervisor determines whether the public checksums match any previously identified checksums for pages stored in the public memory. When the public checksums do not match any other previously identified checksums, method 300 proceeds to block 350. Otherwise, when the public checksums do match another previously identified checksum, method 300 proceeds to block 340.

At block 340, the hypervisor checks the contents of the guest pages with matching checksums. Because the hypervisor cannot fully trust the guests to use the same algorithm to calculate the checksums (for malicious or innocent reasons), the hypervisor uses the public checksums to reduce the number of full pages in the public memory to compare with the newly received page to place into the public memory, but does not rely on matching checksums indicating matching pages. When the hypervisor identifies an already stored page that matches the received page (per block 310), method 300 proceeds to block 360. Otherwise, when the received page does not match any other page already stored in the public memory, despite having a matching checksum, method 300 proceeds to block 350. At block 350, in response to determining that the public memory does not include a second page that matches the page received per block 310 (either via checksum comparison per block 330 or content comparison per block 340), the hypervisor adds the checksum for the received page to a reference table to monitor for future duplicate checksums. In various embodiments, when the hypervisor identified a potentially matching page via the checksums (per block 330) that did not have matching contents (per block 340), the hypervisor may calculate a new checksum for the received page to add to the reference table in addition to or instead of a checksum received from the VM. For example, if the publication checksum from the encrypted VM resulted in the checksum match (per block 330), the hypervisor may calculate a new public checksum for use in future comparisons instead of the VM-provided checksum. In another example, due to the potential use of different checksum generation algorithms, the hypervisor may maintain the matching checksum for a page with non-matching contents so that more than one page in the public memory can be associated with the same checksum.

At block 360, in response to identifying that the received page matches a second page already stored in the public memory, the hypervisor deduplicates the matching page. In various embodiments, the hypervisor can deduplicate the matching page by deallocating (or reallocating) the addresses associated with one of the page received in block 310 or the preexisting page that the received page matches. Accordingly, the hypervisor includes the matched content in one set of addresses in the public memory rather than including multiple copies of the same content in the public memory.

At block 370, in response to receiving a call from a guest for the deduplicated page, the hypervisor serves the merged content (from the addressed storing the matched content) to the requesting guest. In various embodiments, the guest can include an encrypted VM or an unencrypted VM that previously submitted a page to the public memory. The hypervisor may serve the contents multiple times to multiple different guests, and may periodically merge the contents with additional copies of the content (e.g., as received per block 310) to conserve computing resources among multiple guests that have placed identical content into the public memory.

Figure 4A:
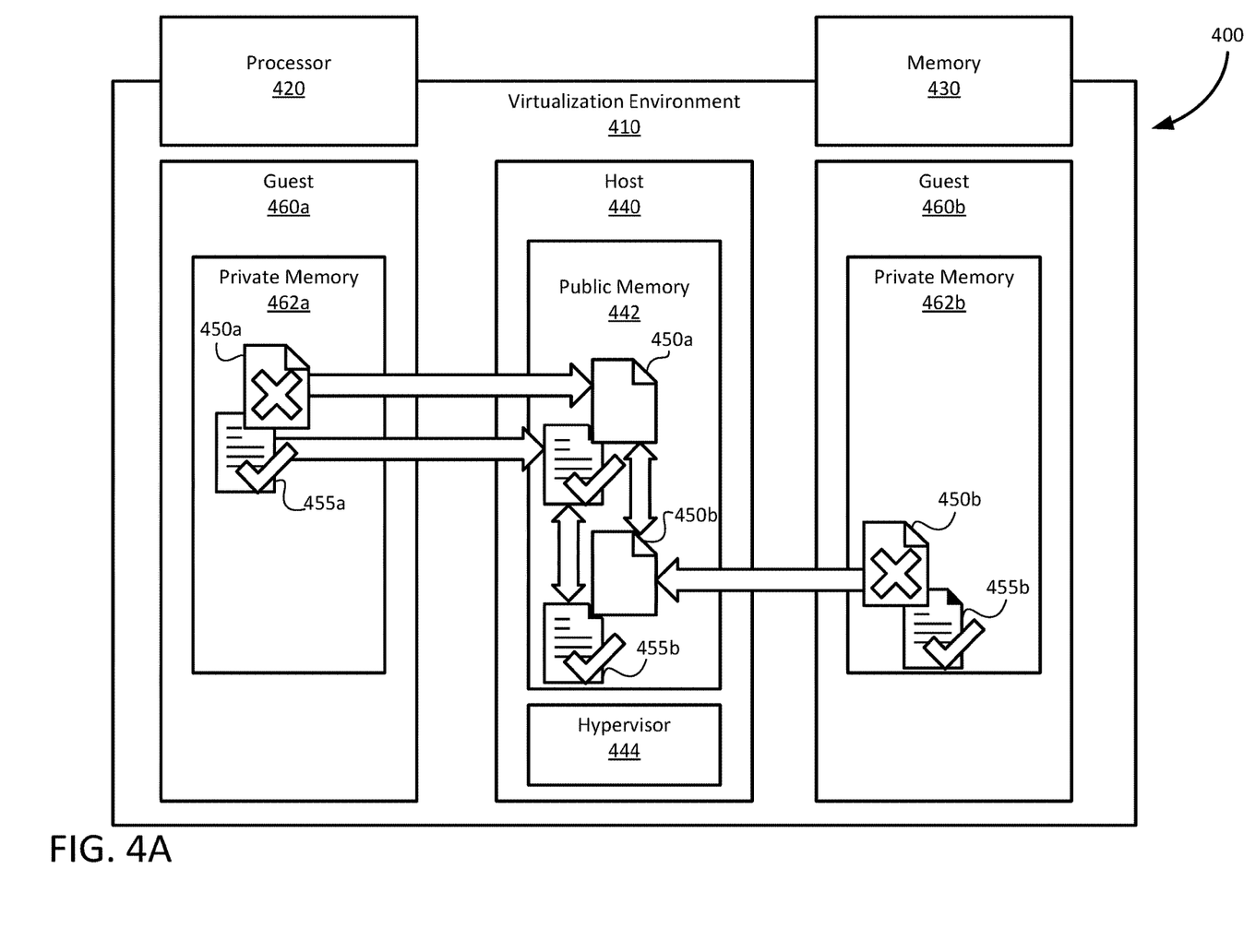
FIGS. 4A and 4B illustrate a virtualization environment engaged in deduplicating pages in memory, according to examples of the present disclosure.
Figure 4B:
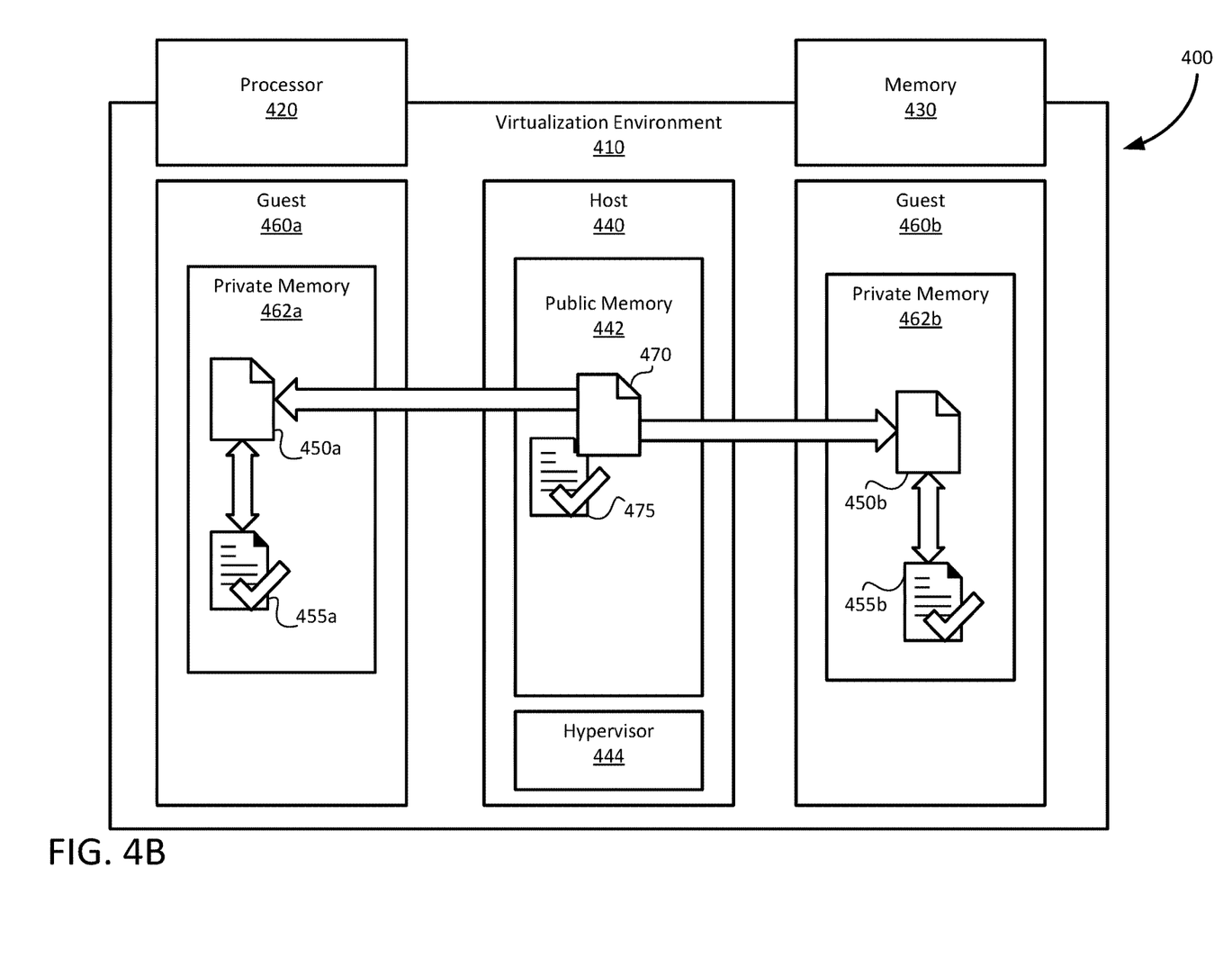

FIGS. 4A and 4B illustrate a system 400 engaged in deduplicating pages in memory, according to examples of the present disclosure. The system 400 includes (at least one) processor 420 and (at least one) memory 430. The memory 430 includes instructions that, when executed by the processor 420, provide a virtualization environment 410 including a host 440 and a plurality of guests 460a-b (generally or collectively, guest 460) which are managed by the host 440. Although the illustrated example in FIGS. 4A and 4B focuses on the communications between the host 440, the first guest 460a, and the second guest 460b, the behavior described in the present disclosure may be performed in parallel (and at various cadences or with different operations occurring at substantially the same time) between the host 440 and several guests 460. Additionally, although illustrated with two guests 460, the virtualization environment 410 may include more or fewer guests 460 in other examples.

The host 440 manages the public memory 442 and provides a hypervisor 444, which schedules access to the resources in the virtualization environment 410 among the host 440 and the guests 460. The guests 460 each respectively may manage portions of the memory 430 privately, such as via encryption, so that the contents of the first private memory 462a (generally or collectively, private memory 462) are accessible only to the first guest 460a and that the contents of the second private memory 462b are accessible only to the second guest 460b.

As illustrated in FIG. 4A, the first guest 460a has identified a first page 450a in the first private memory 462a that can be placed into the public memory 442. The first guest 460a calculates a first publication checksum 455a (generally or collectively, publication checksum 455) associated with the first page 450a, and stores the first publication checksum 455a in the first private memory 462a. The first guest 460a provides the first publication checksum 455a to the host 440 for the host 440 to optionally use in detecting potentially matching pages already or later stored in the public memory 442. After providing the first page 450a to the host 440, the first guest 460a may deallocate the portion of the first private memory 462a used for the first page 450a to allow other data to overwrite the content at those addresses.

Similarly to the first guest 460a, the second guest 460b has identified a second page 450b in the second private memory 462b that can be placed into the public memory 442, which for this example contains the same data as the first page 450a and for which the second guest 460b has calculated a second publication checksum 455b which is stored in the second private memory 462b. However, because the second guest 460b does not provide the second publication checksum 455b to the host 440, the host 440 locally calculates the second publication checksum 455b for use within the public memory 442. After providing the second page 450b to the host 440, the second guest 460b may deallocate the portion of the second private memory 462b used for the second page 450b to allow other data to overwrite the content at those addresses.

The host 440 detects when two or more pages 450 include the same contents to identify when to deduplicate the pages 450. The host 440 uses the checksums 455 as an initial comparison point to identify when a page submitted by a guest 460 matches another page 450 already stored in the public memory 442. Because two pages 450 with different contents may be provided with the same checksum 455 (e.g., maliciously or coincidentally), the host 440 then compares the contents of any pages 450 found to have matching checksums 455 to verify that the pages 450 indeed match one another. Because the initial comparison of the checksums 455 is less computationally intense than comparing the contents of pages 450, the initial analysis of the checksums 455 allows the host 440 to conserve computing resources and focus on comparing the most-likely matches to a given page 450 rather than all previously stored pages 450. Once a match is confirmed between the pages 450, the host deduplicates the pages 450 from the public memory 442 leaving one shared page 470 in the public memory 442, as is illustrated in FIG. 4B. In various embodiments, the shared page 470 may occupy the addresses originally associated with any of the submitted pages 450 or a new memory address. The host 440 stores a shared checksum 475 (equivalent to the first checksum 455a and the second checksum 455b) in association with the shared page 470 for future comparisons against other pages 450 from the various guests 460 for future deduplication processes.

As illustrated in FIG. 4B, once the pages 450 have been deduplicated, consolidating one or more of the individual pages 450 into the shared page 470, the host 440 may respond to requests for the individual pages 450 from the respective guests 460 with the shared page 470. For example, when the first guest 460a requests or calls for the contents of the first page 450a, the host 440 responds by providing the shared page 470. Similarly, when the second guest 460b requests or calls for the contents of the second page 450b, the host 440 responds by providing the shared page 470. Each of the guests 460 compare the received shared page 470 against the stored publication checksums 455 to determine whether to accept the shared page 470 as the respective individual page 450 or take corrective action before continuing with the process that attempted to access the individual page. The host may maintain the shared page 470 in the public memory 442 until each of the guests 460 request the memory be deallocated, the guests 460 end a session in the virtualization environment 410, a time out condition occurs in the virtualization environment 410, the host reprioritizes memory allocation, or the like.

Programming modules, may include routines, programs, components, data structures, and other types of structures that may perform particular tasks or that may implement particular abstract data types. Moreover, embodiments may be practiced with other computer system configurations, including hand-held devices, multiprocessor systems, microprocessor-based or programmable user electronics, minicomputers, mainframe computers, and the like. Embodiments may also be practiced in distributed computing environments where tasks are performed by remote processing devices that are linked through a communications network. In a distributed computing environment, programming modules may be located in both local and remote memory storage devices.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the examples described herein will be apparent to those skilled in the relevant art. Such changes and modifications can be made without departing from the spirit and scope of the present subject matter and without diminishing its intended advantages. It is therefore intended that such changes and modifications be covered by the appended claims.

What is claimed is:

1. A method, comprising:
    identifying a page in a private memory of an encrypted virtual machine to place into a public memory in a virtualization environment;
    calculating a checksum for the page and storing the checksum in the private memory of the encrypted virtual machine;
    subsequently to or contemporaneously with calculating and storing the checksum, passing the page to a hypervisor of the virtualization environment to place into the public memory;
    subsequent to placement of the page into the public memory, calling the page via an application running in the encrypted virtual machine; and
    in response to calling the page, performing, by the encrypted virtual machine, the steps of:
        restoring the page into the private memory from the public memory;
        calculating a verification checksum for the restored page;
        comparing the calculated verification checksum against the calculated checksum stored in the private memory;
        if, based on the comparing, the calculated verification checksum and the calculated checksum match, executing the application using the page; and
        if, based on the comparing, the calculated verification checksum and the calculated checksum do not match, executing the application while preventing the usage of the restored page from the private memory.

2. The method of claim 1, further comprising:
    identifying a second page in the private memory of the encrypted virtual machine to place into the public memory in the virtualization environment;
    calculating a second checksum for the second page and storing the second checksum in the private memory of the encrypted virtual machine;
    passing the second page to the hypervisor to place into the public memory;
    calling the second page via the application running in the encrypted virtual machine;
    receiving a purported second page from the public memory;
    calculating a second verification checksum for the purported second page; and
    in response to the second verification checksum not matching the second checksum, taking a corrective action that identifies the purported second page as not matching the second page submitted to the public memory.

3. The method of claim 1, wherein the page is identified for placing into the public memory in response to identifying that the page encodes at least a portion of an open source software component.

4. The method of claim 1, wherein calling the page results in a fault in the application and the application copies the page from the public memory into the private memory in response to the fault.

5. The method of claim 1, wherein the hypervisor, in response to receiving the page from the encrypted virtual machine to place into the public memory in a virtualization environment, copies the page into the public memory; and wherein the hypervisor, in response to detecting a second page in the public memory that matches the page, deduplicates one of the page and the second page from the public memory.

6. The method of claim 5, further comprising:
    providing the checksum to the hypervisor along with the page to place into the public memory, wherein the hypervisor compares the checksum against a second checksum associated with the second page to detect the second page as potentially matching the page.

7. A system, comprising:
    a processor; and
    a memory, including instructions that when executed by the processor perform operations including:
        identifying a page in a private memory of an encrypted virtual machine to place into a public memory in a virtualization environment;

calculating a checksum for the page and storing the checksum in the private memory of the encrypted virtual machine;

subsequently to or contemporaneously with calculating and storing the checksum, passing the page to a hypervisor of the virtualization environment to place into the public memory;

subsequent to placement of the page into the public memory, calling the page via an application running in the encrypted virtual machine; and in response to calling the page, performing, by the encrypted virtual machine, the steps of:
restoring the page into the private memory from the public memory;
calculating a verification checksum for the restored page;
comparing the calculated verification checksum against the calculated checksum stored in the private memory;
if, based on the comparing, the calculated verification checksum and the calculated checksum match, executing the application using the page; and
if, based on the comparing, the calculated verification checksum and the calculated checksum do not match, executing the application while preventing the usage of the restored page from the private memory.

8. The system of claim 7, the operations further comprising:
identifying a second page in the private memory of the encrypted virtual machine to place into the public memory in the virtualization environment;
calculating a second checksum for the second page and storing the second checksum in the private memory of the encrypted virtual machine;
passing the second page to the hypervisor to place into the public memory;
calling the second page via the application running in the encrypted virtual machine;
receiving a purported second page from the public memory;
calculating a second verification checksum for the purported second page; and
in response to the second verification checksum not matching the second checksum, taking a corrective action that identifies the purported second page as not matching the second page submitted to the public memory.

9. The system of claim 7, wherein the page is identified for placing into the public memory in response to identifying that the page encodes at least a portion of an open source software component.

10. The system of claim 7, wherein calling the page results in a fault in the application and the application copies the page from the public memory into the private memory in response to the fault.

11. The system of claim 7, wherein the hypervisor, in response to receiving the page from the encrypted virtual machine to place into the public memory in a virtualization environment, copies the page into the public memory; and wherein the hypervisor, in response to detecting a second page in the public memory that matches the page, deduplicates one of the page and the second page from the public memory.

12. The system of claim 11, the operations further comprising:
providing the checksum to the hypervisor along with the page to place into the public memory, wherein the hypervisor compares the checksum against a second checksum associated with the second page to detect the second page as potentially matching the page.

13. A memory, including instructions that when executed by a processor perform operations comprising:
identifying a page in a private memory of an encrypted virtual machine to place into a public memory in a virtualization environment;
calculating a checksum for the page and storing the checksum in the private memory of the encrypted virtual machine;
subsequently to or contemporaneously with calculating and storing the checksum, passing the page to a hypervisor of the virtualization environment to place into the public memory;
subsequent to placement of the page into the public memory, calling the page via an application running in the encrypted virtual machine; and
in response to calling the page, performing, by the encrypted virtual machine, the steps of:
restoring the page into the private memory from the public memory;
calculating a verification checksum for the restored page;
comparing the calculated verification checksum against the calculated checksum stored in the private memory;
if, based on the comparing, the calculated verification checksum and the calculated checksum match, executing the application using the page; and
if, based on the comparing, the calculated verification checksum and the calculated checksum do not match, executing the application while preventing the usage of the restored page from the private memory.

14. The memory of claim 13, the operations further comprising:
identifying a second page in the private memory of the encrypted virtual machine to place into the public memory in the virtualization environment;
calculating a second checksum for the second page and storing the second checksum in the private memory of the encrypted virtual machine;
passing the second page to the hypervisor to place into the public memory;
calling the second page via the application running in the encrypted virtual machine;
receiving a purported second page from the public memory;
calculating a second verification checksum for the purported second page; and
in response to the second verification checksum not matching the second checksum, taking a corrective action that identifies the purported second page as not matching the second page submitted to the public memory.

15. The memory of claim 13, wherein calling the page results in a fault in the application and the application copies the page from the public memory into the private memory in response to the fault.

16. The memory of claim 13, wherein the hypervisor, in response to receiving the page from the encrypted virtual machine to place into the public memory in a virtualization environment copies the page into the public memory; and wherein the hypervisor, in response to detecting a second page in the public memory that matches the page, deduplicates one of the page and the second page from the public memory.

17. The memory of claim 16, the operations further comprising:
 providing the checksum to the hypervisor along with the page to place into the public memory, wherein the hypervisor compares the checksum against a second checksum associated with the second page to detect the second page as potentially matching the page.

* * * * *